United States Patent [19]

Inagaki

[11] Patent Number: 4,976,559
[45] Date of Patent: Dec. 11, 1990

[54] TYPEWRITER

[75] Inventor: Yasuro Inagaki, Nagoya, Japan

[73] Assignee: Brother Kogyo Kabushiki Kaisha, Nagoya, Japan

[21] Appl. No.: 189,149

[22] Filed: May 2, 1988

[30] Foreign Application Priority Data

May 2, 1987 [JP] Japan ............................ 62-67079[U]

[51] Int. Cl.$^5$ ........................... B41J 29/02; B41J 5/08
[52] U.S. Cl. .................................. 400/691; 400/682; 400/693; 400/472
[58] Field of Search ............... 461/679, 680, 681, 682; 400/320, 120, 691, 692, 693, 680, 681, 682, 685, 472, 473, 679; 235/146, 145

[56] References Cited

U.S. PATENT DOCUMENTS

| | | | |
|---|---|---|---|
| 3,732,965 | 5/1973 | Mero | 400/682 |
| 3,830,352 | 8/1974 | Kolpek | 400/682 |
| 4,378,553 | 3/1983 | McCall | 400/682 X |
| 4,564,751 | 1/1986 | Alloy et al. | 400/473 X |
| 4,595,804 | 6/1986 | MacConnell | 400/682 X |
| 4,661,005 | 4/1987 | Lahr | 400/680 X |
| 4,704,604 | 11/1987 | Fuhs | 400/682 X |
| 4,706,096 | 11/1987 | Sato | 400/120 X |
| 4,734,710 | 3/1988 | Sato et al. | 400/692 X |

FOREIGN PATENT DOCUMENTS

| | | |
|---|---|---|
| 85402248.0 | 11/1985 | European Pat. Off. . |
| 83300114.2 | 1/1988 | European Pat. Off. . |
| 25476 | 3/1981 | Japan ........................... 400/692 |
| 116157 | 7/1983 | Japan ........................... 400/692 |
| 132657 | 6/1987 | Japan ........................... 400/472 |
| 278066 | 12/1987 | Japan ........................... 400/472 |
| 82/00905 | 7/1982 | PCT Int'l Appl. . |
| 8810401-3 | 6/1988 | United Kingdom . |

OTHER PUBLICATIONS

IBM Tech. Discl. Bulletin, "Keyboard Equipped with Two Key Layouts", vol. 30, No. 7, Dec. 1987, pp. 428-429.

Primary Examiner—Edgar S. Burr
Assistant Examiner—Motilal P. Patel
Attorney, Agent, or Firm—Kane, Dalsimer, Sullivan, Kurucz, Levy, Eisele and Richard

[57] ABSTRACT

A keyboard section and a print mechanism section of a typewriter are housed in separate housings which may be mechanically joined together through connect means comprising first and second engaging means provided in the respective housings. In the assembled condition, the keyboard housing may be held in position relative to the print mechanism housing against moving in any direction and therefore operated even when there is no available space for the keyboard housing itself.

10 Claims, 10 Drawing Sheets

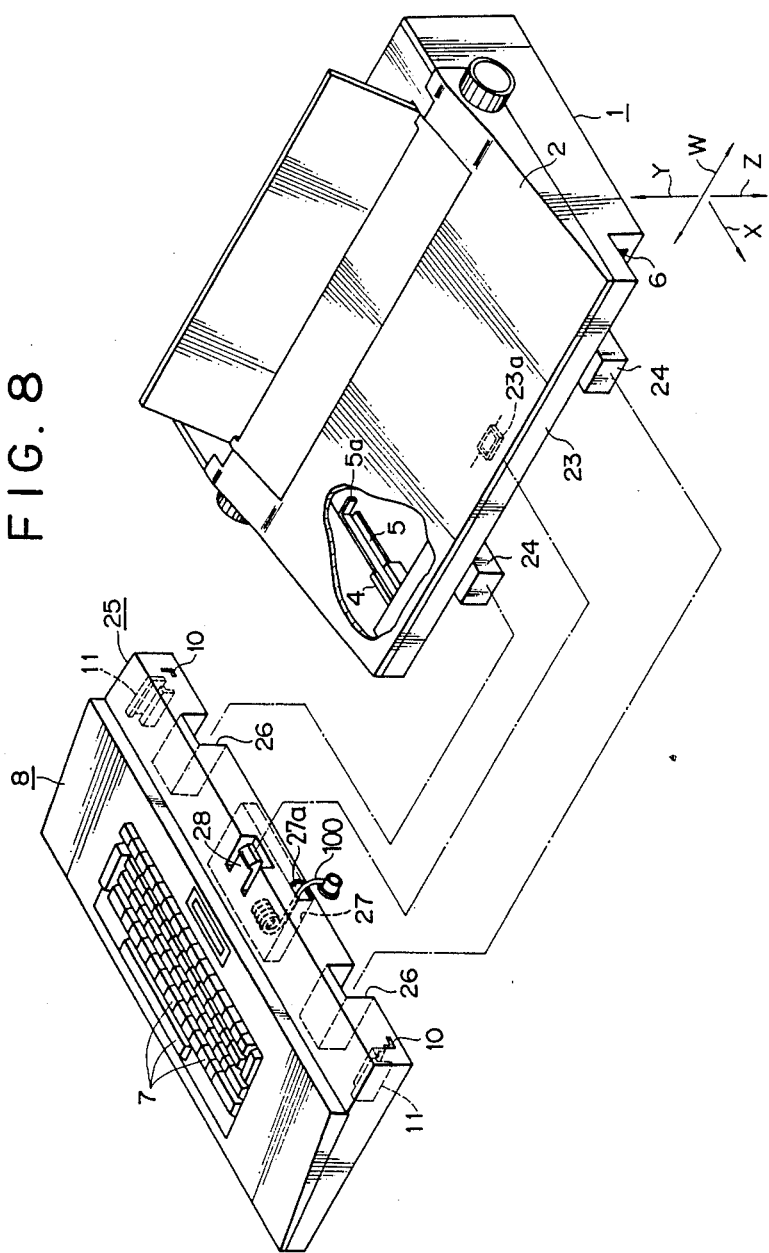

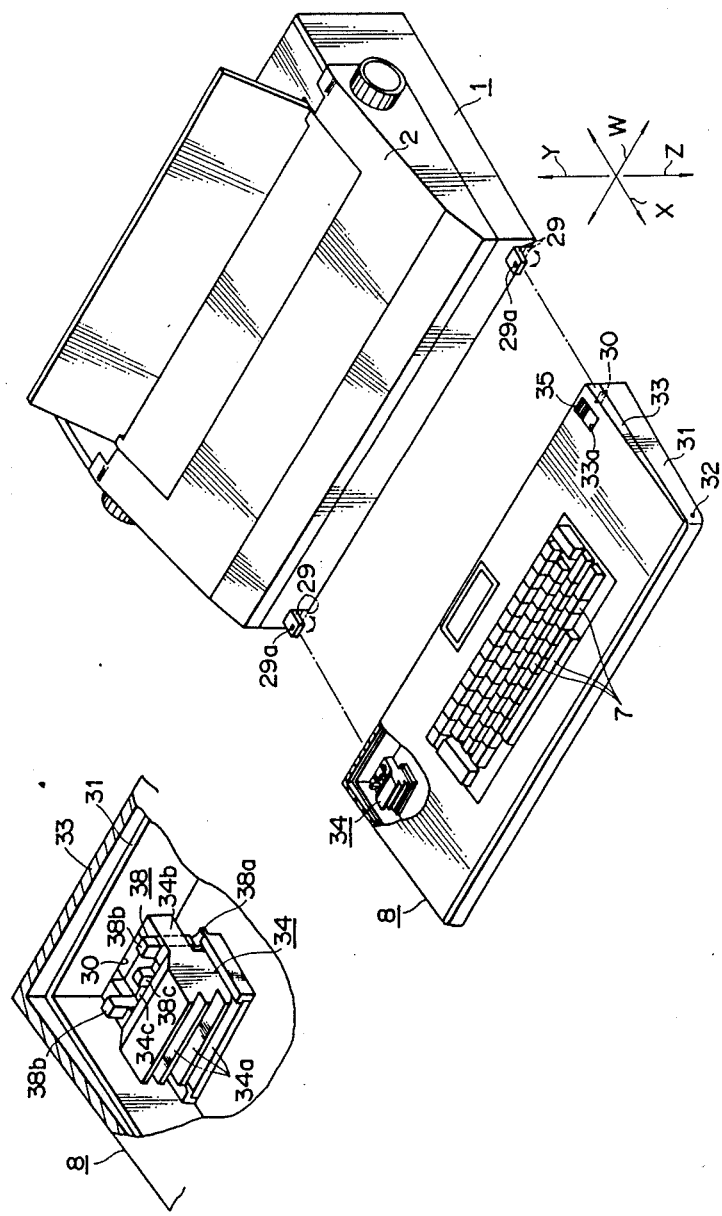

4,976,559

TYPEWRITER

BACKGROUND OF THE INVENTION

This invention relates to a typewriter, and more particularly to a typewriter comprising a keyboard unit and a print mechanism unit detachably connected to each other.

There has been proposed a typewriter having a keyboard unit arranged mechanically independent of a print mechanism unit but electrically connected to the latter by means of a curl cord or the like. This prior art typewriter allows the keyboard unit to be positioned spaced apart from the print mechanism unit a distance within the length of the curl cord. The operator can thus operate the typewriter with the keyboard being placed at a desired position. Further, this prior art typewriter arrangement may be so constructed that a single keyboard unit is connectable to any desired one of several print mechanism units having different kinds of print heads inclusive of daisy wheel type, thermal transfer type and laser printer type, for example.

The operator is generally required to visually check the characters actually printed on a print sheet fed through the print mechanism unit during typing. The print sheet should be often set and reset to the print mechanism unit. Consequently, in actual typing operation, it has been difficult to position the keyboard unit too much further from the print mechanism unit. When an available space left on the desk is too limited to mount the keyboard unit at the front side of the print mechanism unit, it will be necessary to install a stand or support in front of the desk for providing an additional space for mounting the keyboard unit.

SUMMARY OF THE INVENTION

The principal object of the invention is therefore to provide a novel typewriter construction comprising a print mechanism unit and a keyboard unit easily connectable to and detachable from the print mechanism unit.

Another object of the invention is to provide mechanical engaging means for connecting the keyboard unit in mechanical engagement with the print mechanism unit of a typewriter so that the typewriter may be operated with the keyboard unit being projected forward beyond the desk.

According to an aspect of the invention, there is provided a typewriter comprising a keyboard unit having a plurality of operational keys and housed in a first housing; a print mechanism unit operated in response to signals from the keyboard unit to print characters on a print medium and housed in a second housing; and mechanical connect means for mechanically connecting the keyboard unit and the print mechanism unit in such manner that the keyboard unit is supported by the print mechanism unit while being held in position against movement relative to the print mechanism unit at least in a downward pressing direction.

BRIEF DESCRIPTION OF THE ACCOMPANYING DRAWINGS

FIG. 8 is an exploded perspective view, partly in broken, illustrating a typewriter according to still another modified embodiment;

FIG. 10 is an exploded perspective view, partly in broken, illustrating a still another modification of the typewriter embodying the invention;

FIG. 13 is a perspective view, partly in broken, on an enlarged scale, showing the engaging portion provided in a keyboard housing of the typewriter shown in FIG. 10;

DESCRIPTION OF THE EMBODIMENTS

Figure 1:
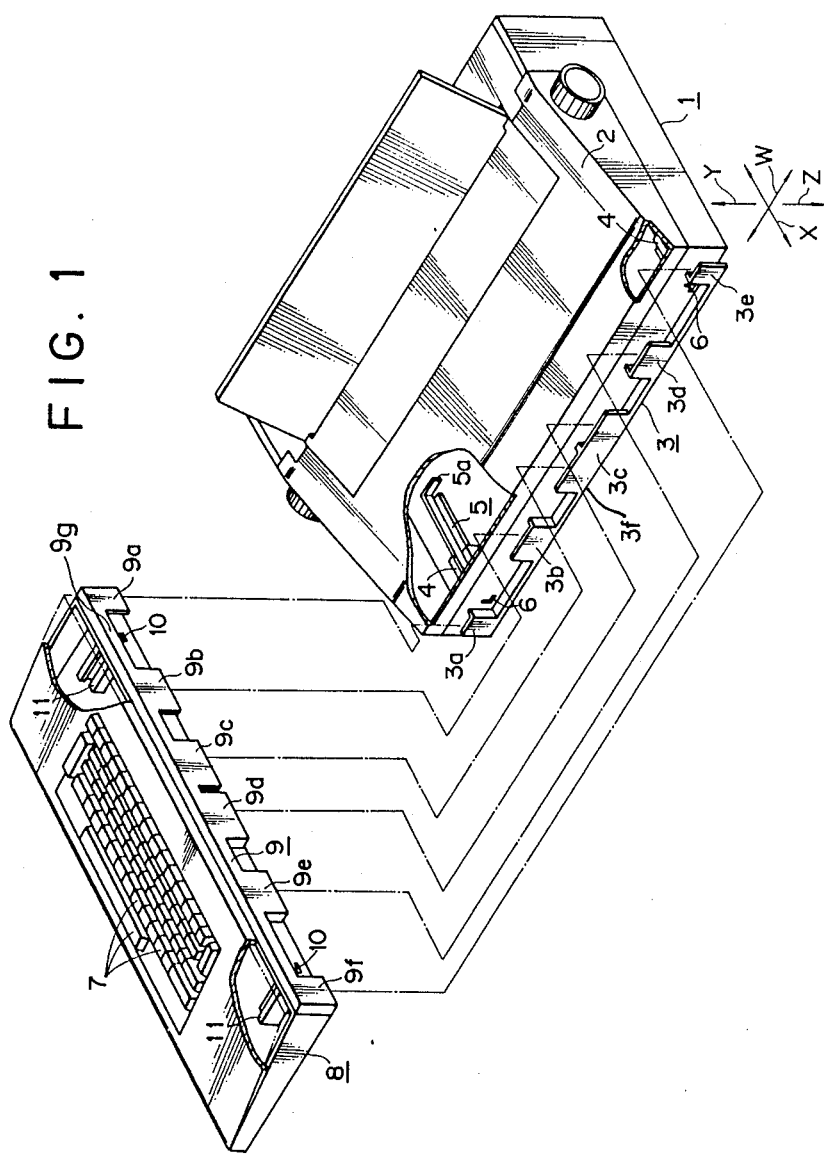
FIG. 1 is an exploded perspective view, partly in broken, illustrating a typewriter embodying the invention.
Figure 2:
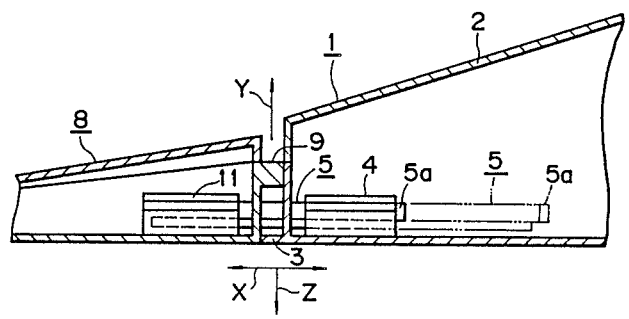
FIGS. 2 and 3 are sectional views showing the engaging portions of the typewriter shown in FIG. 1 in an assembled construction.
Figure 3:
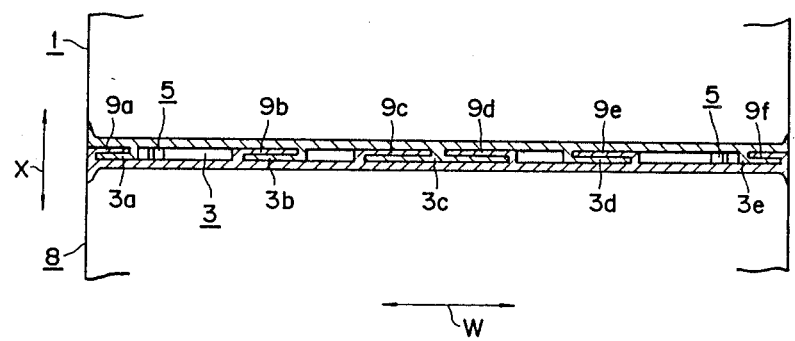

Referring specifically to FIGS. 1 to 3, an electronic typewriter embodying the invention is constituted by separate two parts, namely a print mechanism unit and a keyboard unit. The print mechanism unit includes a platen for supporting and feeding a print sheet and a print head adapted to reciprocate along the platen to print characters on the print sheet, which is encircled in a housing 1. A top cover 2 is removably fitted to the housing 1 to usually close the upper opening of the housing 1. In case of maintenance and repairs of the print mechanism, the top cover 2 is removed from the housing 1 to open the print mechanism inside the housing 1.

To the front face of the housing 1 is attached a supporting frame 3 along substantially the entire width of the housing 1. The supporting frame 3 includes integral portions of vertically extending walls 3a, 3b, 3c, 3d and 3e which are interconnected by a laterally extending rim 3f and spaced apart from the front face of the housing 1 to provide a predetermined gap therebetween. As shown in FIGS. 1 and 3, the walls 3a and 3b has L-shaped cross sections and the walls 3e and 3d has inverted L-shaped cross sections, each having an inwardly projecting portion at one end thereof. The central wall 3c has, in turn, substantially T-shaped cross section having an inwardly projecting portion at a center thereof.

A pair of guide frames 4 are secured to the bottom of the housing 1 near the opposite sides. Each guide frame 4 provides substantially a L-shaped hollow space adapted to fitly receive a reinforcing rod 5 having a corresponding L-shaped cross section is inserted and may be reciprocated in the direction X (FIG. 1) by manually operating a hook 5a provided at one end thereof. L-shaped slots 6 are opened in the front face of the housing 1 to allow the reinforcing rods 5 to project forward beyond the front face. The hook 5a is engageable with the rear end of the guide frame 4 and therefore serves as a stop member restricting the stroke of movement of the reinforcement rod 5.

The keyboard unit housed in a keyboard cover 8 is furnished with a plurality of operational keys 7 for inputting corresponding signals to the print mechanism for printing operation. To the rear face of the keyboard cover 8 is attached a supporting frame 9 which is so shaped as to engage with the supporting frame 3 of the housing 1. More particularly, as best shown in FIG. 3, the supporting frame 9 includes downwardly extending walls 9a, 9b, 9c, 9d, 9e and 9f each having substantially a L-shaped cross section cooperated with the upwardly extending walls 3a, 3b, 3c, 3d and 3e of the supporting frame 3 to mechanically lock these two separate units. These two separate units can be assembled by inserting the walls 9a to 9f of the supporting frame 9 of the keyboard cover 8 to the respective gaps defined by the walls 3a to 3e of the supporting frame 3 of the housing 1. In the assembled condition, relative displacement between the housing 1 and the keyboard cover 8 in the direction of W is prevented by handshake engagement between the L-shaped walls 3a and 9a, 3b and 9b, 3d and 9e and 3e and 9f respectively, and also by holding the T-shaped wall 3c from both sides by the L-shaped walls 9c and 9d. The thickness of the respective walls is determined half a distance between the front face of the housing 1 and the rear face of the keyboard cover 8 to thereby prevent displacement therebetween in the direction of X. The upper edges of the walls 3a to 3e are aligned to contact with the upper ridge 9g and the lower edges of the walls 9a to 9f are alighed to contact with the rim 3f so that vertical displacement between the housing 1 and the keyboard cover 8 in the directions Y and Z will also be prevented. Accordingly, through such mechanical engagement of the housing 1 and keyboard cover 8, the assembled typewriter is held in position without displacement therebetween in any direction.

The rear face of the keyboard cover 8 has L-shaped slots 10. On the bottom of the cover 8 is secured guide frames 11 for accomodating the reinforcing rod 5 extending through the slots 6 and 10 in the assembled condition. More particularly, after establishing the mechanical engagement between the housing 1 and the keyboard cover 8 in the above described manner, the operator removes the cover 2 and manipulates the hook 5a to push the reinforcing rod 5 from a retracted position shown by a double-dotted chain line to an operating position shown by a solid line in FIG. 2 until the hook 5a reaches the rear end of the guide frame 4. The rod 5 thus extends through the slots 6 and 10 to be received by the guide frame 11 of the keyboard cover 8. The reinforcing rod 5 serves as a second mechanical engagement means between the housing 1 and keyboard cover 8 and additionally prevents relative displacement therebetween in the directions Y, Z and W.

The print unit and the keyboard unit are electrically connected together by means of a curl cord (not shown) so that the signals entered through operation of the keyboard unit are sent to the print unit via the curl cord, regardless whether the two units are in joined or separated condition.

In case that an ample desk space is available enough to place both units on the desk in the disassembled or separate condition, the keyboard may be moved to a location on the desk most convenient to the operator for typing operation. The curl cord extending from the keyboard unit can be connected to other printing equipments with different types of print head such as daisy wheel and thermal printers.

If, in turn, the desk space is too limited to place both the separate units, only the print unit is placed on desk, with the engaging walls 9a to 9f of the keyboard cover 1 being fitted into the receiving walls 3a to 3e. The top cover 2 is then removed and the reinforcing rods 5 are pushed to pass through the slots 6 and 10 until their hooks 5a come into engagement with the rear end of the guide frame 4.

In this assembled state, engagement of the walls 9a to 9f with the walls 3a to 3e causes the keyboard unit to be held in position relative to the print unit against moving in back and forth direction X, right and left direction W and downward direction Z. Engagement of the reinforcing rods 5 with the guide frames 11 holds the keyboard cover 8 stationary against moving in right and left direction W and up and down directions Y and Z. With the two units thus joined and assembled, therefore, the keyboard unit may project forward beyond the desk and can be supported by the stationarily mounted print unit like a cantilever. Since the keyboard can be operated in this position projected beyond the front edge of the desk, the operator is allowed to easily check during typing operation the characters printed on the print sheet fed through the print unit which is positioned just behind the keyboard unit. Feeding and replacing of the print sheet may easily be done.

To detach the keyboard unit from the print unit, the keyboard cover 8 has only to be lifted up after sliding the reinforcing rod 5 back to the retracted position indicated by the double-dotted chain line in FIG. 2.

Figure 4:
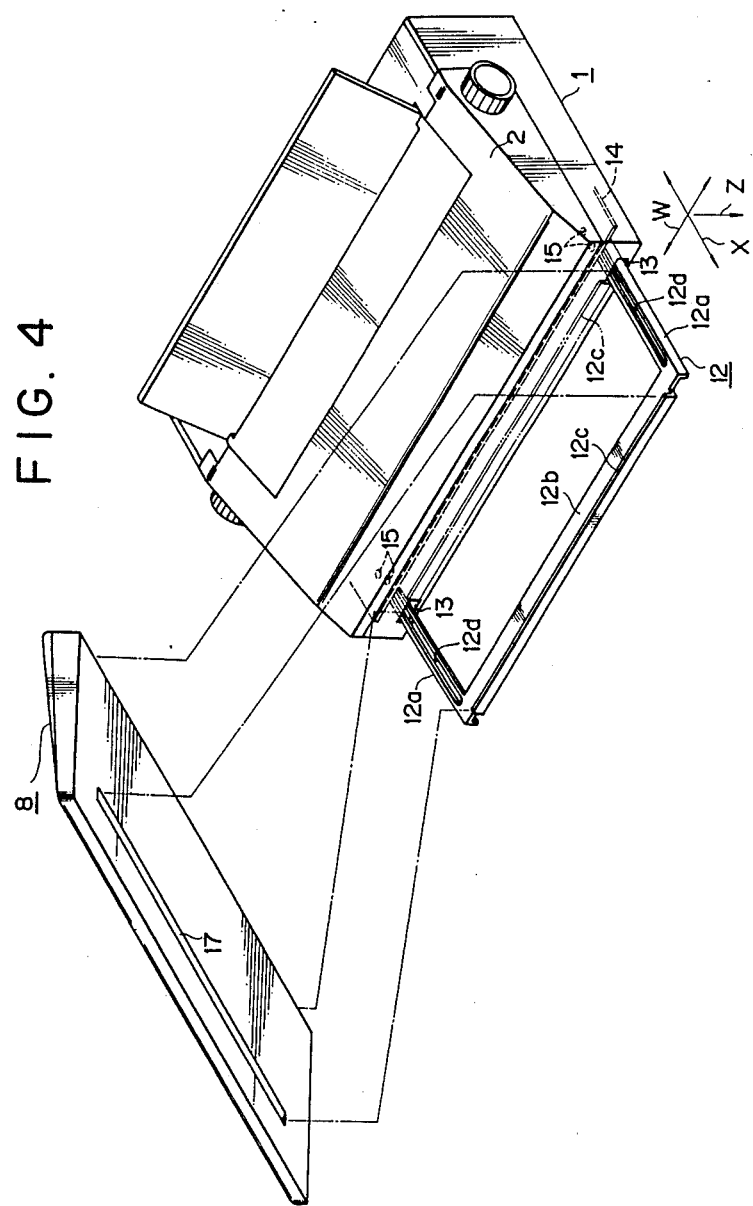
FIG. 4 is an exploded perspective view illustrating a typewriter according to a modified embodiment.
Figure 5:
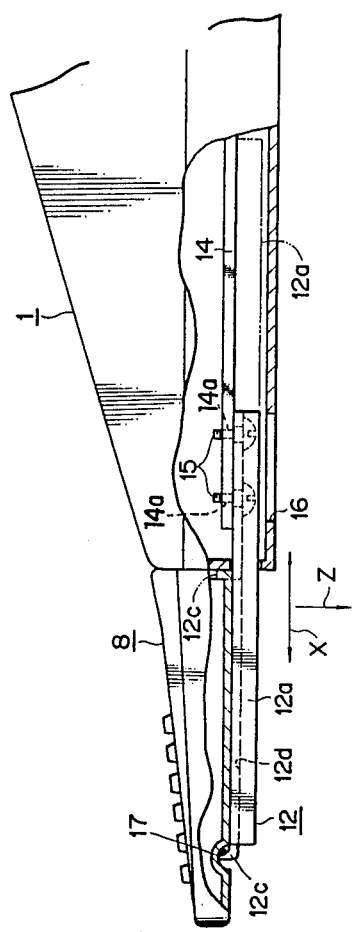
FIG. 5 is a side view, partly in broken, illustrating the typewriter shown in FIG. 5.

Mechanical engaging means for detachably joining the print unit and the keyboard unit together may be modified as shown in FIGS. 4 and 5. Throughout this and other embodiments, like reference numerals and symbols indicate like parts in the embodiment which has been described in reference to FIGS. 1 to 3. Explanation for the like parts will therefore be eliminated.

The print unit housing 1 has a supporting frame 12 which is movable back and forth in the direction X. More particularly, the supporting frame 12 consists of right and left guides 12a longitudinally extending in parallel with each other and a connecting rim 12b interconnecting the leading ends of the guides 12a. The guides 12a include elongate grooves 12d. The connecting rim 12b is provided with an engaging ridge 12c extending laterally and upwardly projecting from the front end of the rim 12b. The free ends of the guides 12a are fitted into the housing 1 passing through apertures 13 provided on the front face of the housing 1. Inside the housing 1 is provided a supporting plate 14 extending in parallel with the bottom of the housing 1 leaving a space for accomodating the supporting frame 12. A plurality of stepped screws 15 can be fastened through apertures 16 provided at the bottom of the housing 1, into threaded holes 14a of the supporting plate 14, with their shanks extending through the grooves 12d. With the screws 15 loosened, the supporting frame 12 can be moved back and forth along the grooves 12d between a retracted position indicated by a double dotted chain line and an operational position by a solid line in FIG. 5.

The supporting frame 12 can be fixed at a desired position between these two extreme positions by fastening the screws 15.

The keyboard cover 8, on the other hand, is provided at its bottom surface with a laterally extending groove 17 adapted to receive the ridge 12c of the supporting frame 12.

If the installation space on desk is not enough, the screws 15 are loosened to pull the supporting frame 12 forward to the operational position where the supporting frame 12 is fixed by fastening the screws 15. The keyboard cover 8 is then mounted on the supporting frame 12 projecting forward of the housing 1 with the ridge 12c being received within the groove 17. In this joined state, the keyboard unit is held in position relative to the print unit against moving in back and forth direction X and right and left direction W, due to engagement between the ridge 12c and groove 17. The relative positioning between these two units in the direction X may be further enhanced by engagement between the contact surfaces of the front face of the housing 1 and the rear face of the keyboard cover 8 as shown in FIG. 5. Also, the keyboard unit is supported by the frame 12 to be prevented from downward movement in the direction Z.

Thus, the keyboard unit can be stably supported in position beyond the front end of the desk, where the operator is able to access the keyboard for typing operation. In this embodiment, joining and detaching operation of the two units will be very easy.

Figure 6:
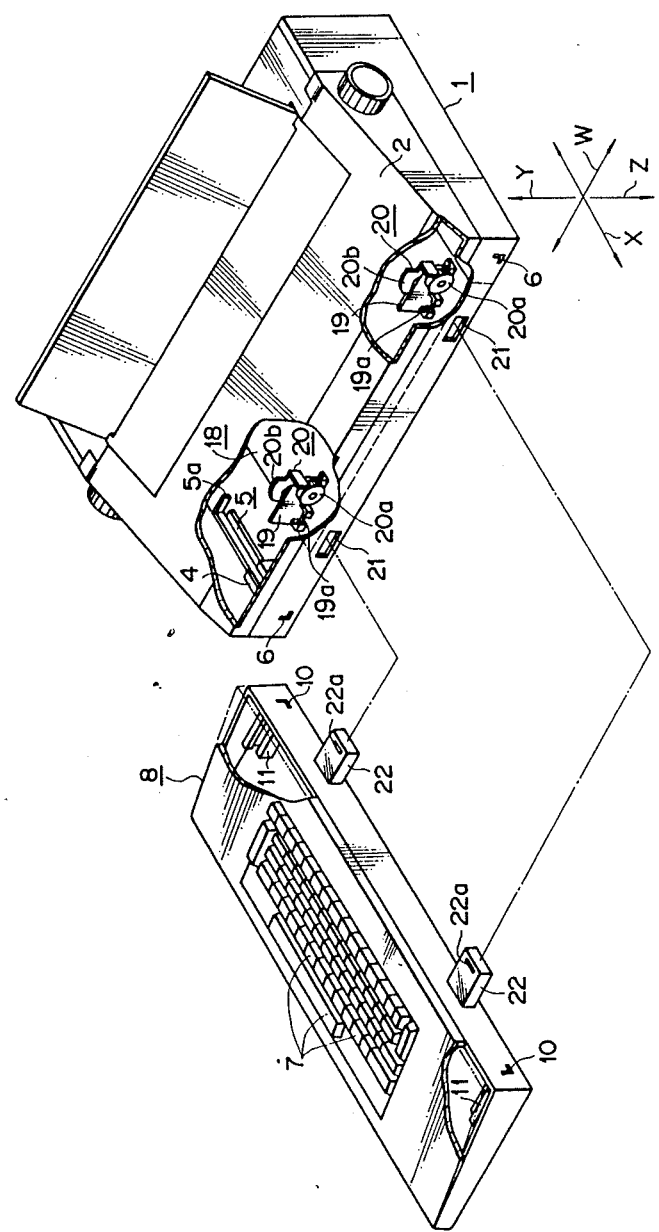
FIG. 6 is an exploded perspective view, partly in broken, illustrating a typewriter according to another modified embodiment.
Figure 7:
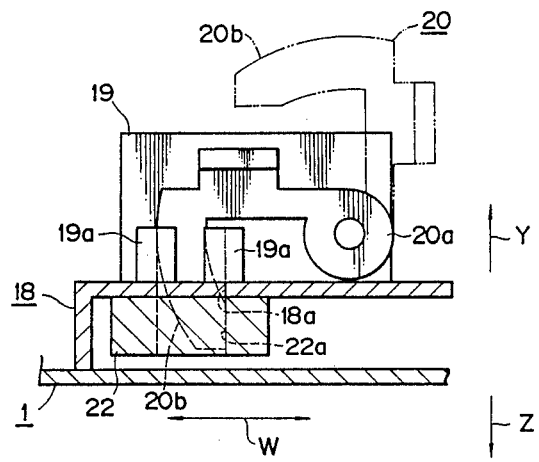
FIG. 7 is a front view, partly in broken, showing the engaging portions of the typewriter shown in FIG. 6 in an assembled construction.

Further modified engaging means is illustrated in FIGS. 6 and 7. Inside the print unit housing 1 is formed a platform 18 on which a pair of upright support brackets 19 each including a guide gate 19a projecting forward therefrom. Engaging pieces 20 has substantially L-shaped configuration consisting of base portions 20a pivotted to the support brackets 19 and hook portions 20b. As shown in FIG. 7, each engaging piece 20 may be thus pivotted between a retracted position shown by a dobble-dotted chain line in which the hook 20b is raised apart from the platform 18 and an operatable position shown by a solid line in which the hook 20b is caught by the guide gate 19a and passed down through an aperture 18a of the platform 18. There are also provided a pair of through holes 21 for receiving a pair of projections 22 formed at the rear face of the keyboard cover 8. The leading ends of the projections 22 are formed with slots 22a adapted to receive the hooks 20b.

This embodiment also includes the reinforcing rods 5 having the operating hook portions 5a, which will be slidably supported by the guide frames 4 formed inside the housing 1 and can extend forward through the apertures 6 and 10 to be received in the guide frames 11 provided inside the keyboard cover 8. Such construction is just the same as in the embodiment shown in FIGS. 1 to 3 and will therefore not be described in more detail.

With the embodiment shown in FIGS. 6 and 7, provided that the desk space available is not ample enough to place the keyboard unit separately and detached from the print unit, the keyboard cover 8 is pulled toward the front face of the housing 1 so that the projections 22 are inserted into the apertures 21 to project between the bottom of the housing 1 and the platform 18, to thereby join the two units. With the top cover 2 then removed, the engaging pieces 20 in the retracted position is rotated to the operational position where the hooks 20b are received in the slots 22a through the apertures 18a.

Then, the reinforcing rod 5 is pushed forward so that the leading end portions thereof are fitly inserted into the guide frames 11. Thus, the keyboard unit is supported only by the print unit placed on desk and can be held in position while restricting its movements in any direction.

Figure 9:
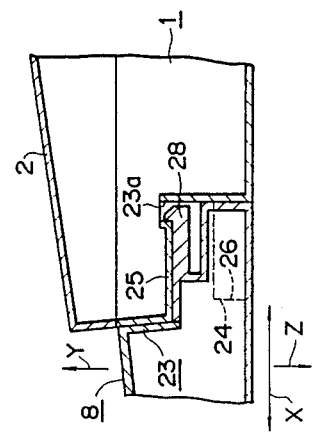
FIG. 9 is a sectional view showing the engaging portions of the typewriter shown in FIG. 8 in an assembled construction.

FIGS. 8 and 9 illustrates still another modified arrangement of the engaging means between the print unit housing 1 and the keyboard cover 8. In this modification, the housing is provided at its front face with a forwardly projecting overhang 23. Beneath the overhang 23, a pair of protrusions 24 extends longitudinally from the housing 1, paralle with each other. The underside of the overhang 23 defines around its center an aperture 23a vertically extending through the housing 1.

The keyboard cover 8 has, on the other hand, at its rear end a projecting sole 25 engageable with overhang 23. At the rear end of the sole 25 are provided recesses 26 for receiving the protrusions 24. The projecting sole 25 has at its top center a flexible tongue 28 engageable with the aperture 23a. the top cover 2 is removed to establish engagement by means of the reinforcing rods 5 and the associated parts, which will reinforce relative displacement between the two unit in the lateral direction W and vertical directions Y and Z.

According to this modification, engagement between the entire top face of the projecting sole 25 engages with the underside of the overhang 23 over relatively a wide area will be well durable against the downward pressing force exerted during typing in the assembled condition. The interconnecting parts of the housing 1 and the cover 8 are all covered with the overhang 23 to thereby maintain a neat appearance of the typewriter. The curl cord would not affect installation and operation of the keyboard because it is stored into the storage cavity 27 when the units are joined together.

Still another embodiment of the invention will be described in reference to FIGS. 10 to 14. The print unit housing 1 is provided at its front edge with a pair of engaging pieces 29 which are pivotal between a retracted position as indicated by a double-dotted chain line in FIG. 10 where it is retracted to be aligned with a plane of the front edge of the housing 1 and an operational position Thus, by pushing the keyboard unit back toward the print unit, these two units may be joined together due to engagement between the protrusions 24 and recesses 26 and between the tongue 28 and aperture 23a, as well as by means of the reinforcing rod 5 extending through the apertures 6 and 10 and received by the guide frames 4 and 11. Inside the projecting sole 25 is provided a storage cavity 27 between the two recesses 26 for retaining the curl cord 100. One end of the curl cord connected to the keyboard unit is drawn out of the storage cavity 27 through an aperture 27a to be coupled with a connector (not shown) provided on the front end of the housing 1.

If an available installation space on the desk is not enough with the two units detached, the print unit is first placed on the desk. Then, the curl cord is withdrawn from the storage cavity 27 through the aperture 27a, and the keyboard cover 8 is pulled toward the front end of the housing 1 so that the protrusions 24 are fitted into the corresponding recesses 26 whereby the projecting sole 25 is put under the overhang 23 and finally the tongue 28 is caught within the aperture 23a, as shown in FIG. 9. The two units 1 and 8 are thus joined together and held in position against relative movement in the respective directions W, X, Y and Z. After that, indicated by a solid line where it projects forward beyond the front edge. Each engaging piece 29 has a hole 29a.

The keyboard cover 8 consists of a bottom wall 31 and a top cover 33 extending over the bottom wall 31 and pivotally movable within a predetermined angle about a pivot 32 extending laterally along a front edge of the bottom wall 31. The top cover 33 is provided with a plurality of operating keys 7. The rear end of the bottom wall 31 has a pair of apertures 30 engageable with the engaging pieces 29 in the operational position.

At the rear ends inside the keyboard cover 8 are provided a pair of tilt mechanisms K. The tilt mechanisms K comprise, in general, engaging blocks 34, one of which is shown in FIGS. 10 and 13, and pivotal hooks 37 (FIGS. 11 and 12) engageable with the blocks 34. More particularly, the blocks 34 provided at its front end with three stepped grooves 34a are secured to the bottom wall 31 in alignment with the apertures 30. The top cover 33 defines openings 33a located in opposition to the respective engaging blocks 34. The underside of the top cover 33 has secured thereto two pairs of pivot studs 33b, each pair being projected down at the opposite sides of the opening 33a to support a pivot 36. A push lever 35 is rotatable about the pivot 36, which is integrally formed with the hook 37 projecting downward to be engageable with the groove 34a. The push lever 35 is normally biased to substantially close the opening 33a by means of a spring (not shown) wound around the pivot 36. By depressing the push lever 35 in its normal position shown by a solid line in FIG. 11 against the force of the spring, it is rotated to another position shown by a double-dotted chain line where the hook 37 is disengaged from the groove 34a, allowing the top cover 33 to swing about the pivot 32. With the top cover 33 rotated to a desired position, depressing force against the push lever 35 is released so that the hook 37 is engaged with another groove 34a. The top cover 33 can thus be maintained in three different tilt positions determined by the three grooves 34a. The operator may operate the keyboard at a desired inclination angle of the top cover 33.

Figure 14:
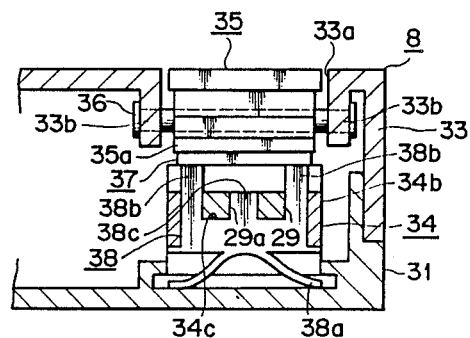
FIG. 14 is a sectional view taken along the line A—A in FIG. 11.
Figure 11:
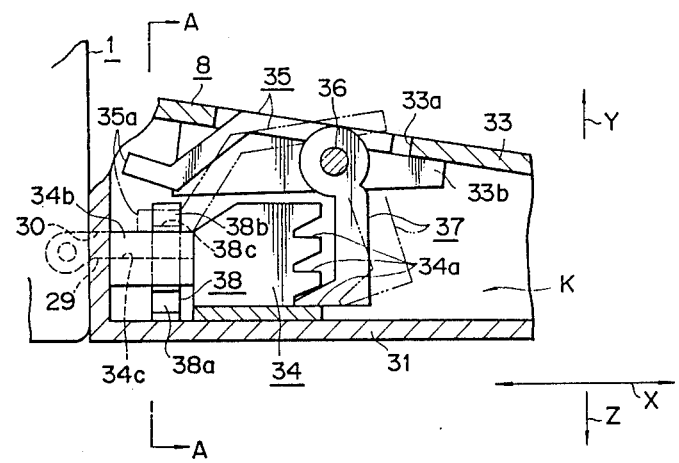
FIGS. 11 and 12 are sectional views showing the engaging portions of the typewriter shown in FIG. 10.
Figure 12:
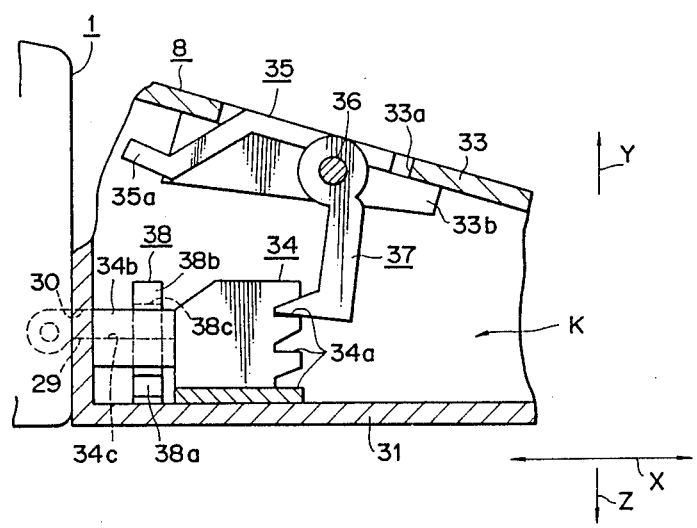

The engaging block 34 has a support section 34b projecting toward the rear face of the base cover 31. The upper portion of the support section 34b is centrally recessed to form a guide recess 34c for fitly receiving the engaging piece 29 extending through the aperture 30. An operating piece 38 is provided movable up and down with respect to the support section 34b. The operating piece 38 consists of a pair of spring portions 38a projecting diagonally downward, and three upward projecting lugs including a pair of higher lugs 38b adapted to hold the engaging piece 29 therebetween and a center lower lug 38c adapted to be received in the hole 29a, as best shown in FIGS. 13 and 14. The operating piece 38 may be moved in a vertical direction through elasticity of the spring portions 38a, the leading ends of which can be received in recesses 31a formed on the base cover 31 when the operating piece 38 is depressed downwardly.

The operating piece 38 is operated by the push lever 35. When the push lever 35 is depressed to bring an engaging end 35a thereof into engagement with the higher lugs 38b, the operating piece 38 is moved down against the biasing force of the spring portions 38a so that the engaging lug 38c is removed from the guide recess 34c. Thus, the engaging piece 29 is allowed to move through the opening 30 and along the recess 34c. With the engaging piece 29 received in the recess 34c, the push lever 35 is released to insert the lug 38c into the hole 29a of the piece 29 to establish engagement therebetween. Due to such engagement, the keyboard unit is held in position in any direction of X, Y, Z and W.

Figure 15:
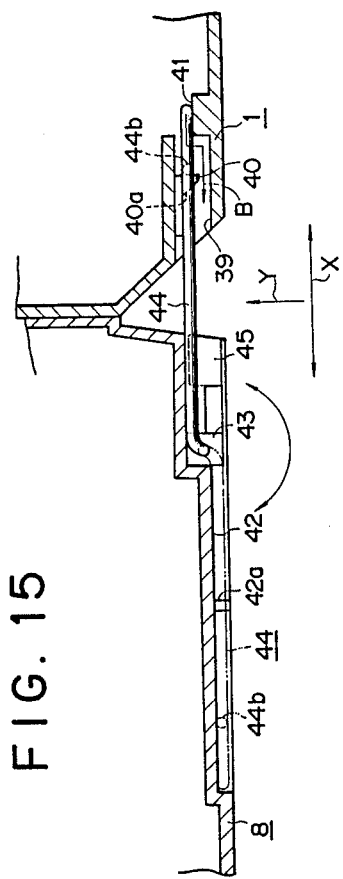
FIGS. 15 and 16 are partial side and bottom views, partly in broken, illustrating a yet modified embodiment of the invention.
Figure 16:
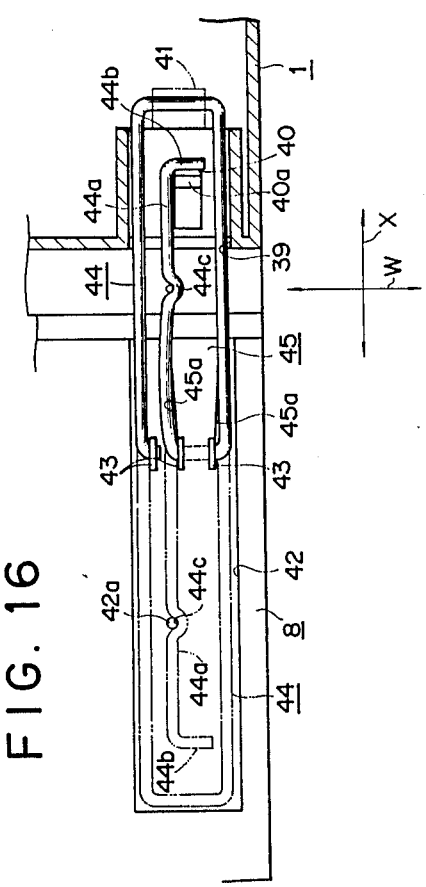

The print unit and the keyboard unit may alternatively be joined through mechanical engaging means shown in FIGS. 15 and 16. In this embodiment, the front face of the housing 1 includes a pair of receiving openings 39. Inside the opening 39, a projection 40 having a tapered front surface 40a projects downwardly and a raised platform 41 extends upwardly in the rearward of the projection 40.

The keyboard cover 8 is provided at both ends of its bottom with a pair of elongate storage cavities 42 adapted to be opposed to the openings 39 in the joined state. Within the cavity 42 is mounted a horizontally extending journal 43 on which an engaging wire 44 bent to substantially a rectangular shape is rotatably supported with its base end, as shown by the arrow in FIG. 15. A longitudinally extending arm 44a of the wire 44 has at its center a curved portion 44c engageable with a stop pin 42a vertically projecting within the storage cavity 42 in a retracted position of the wire 44 indicated by a double-dotted chain line in FIGS. 15 and 16. A free end of the wire 44 is curved to form a hook portion 44b engageable with the rear surface of the projection 40 in an operational position of the wire 44 indicated by a solid line. The arm 44a is well flexible due to its material characteristics and provision of the curved postion 44c. Behind the journal 43 is provided a tongue 45 projectively retained in the storage cavity 42.

The engaging wire 44 can be rotated between the operational position in which it projects from the rear end of the keyboard cover 8 and the retracted position in which it is stored in the cavity 42. With the wire 44 stored in the cavity 42, the curved portion 44c is retained in position by engagement with the stop pin 42a to prevent the wire 44 from its free rotation. On the other hand, where the keyboard unit is to be joined to the print unit, the wire 44 is rotated from the retracted position to the operational position. During rotation of the wire 44, the base end is being guided along tapered surfaces 45a of the tongue 45 to be flexibly expanded outwardly, whereby the hook portion 44b will be fittedly engaged with the projection 40. Therefore, through engagement between the wires 44 and the openings 39 as well as engagement between the hook portions 44b and projections 40, the keyboard unit can be held in position relative to the print unit against displacement in any direction X, Y and W. To separate the keyboard unit from the print unit, the flexible arm 44a is pulled down to disengage the hook portion 44b from the projection 40 and thereafter the keyboard cover 8 is pulled apart from the housing 1 so that the wire 44 is moved relative to the housing 1 along the travel path B shown in FIG. 15. Then, the wire 44 is rotated toward the retracted position in which it is stored in the cavity 42.

Such arrangements of the mechanical engaging means between the two separate units will allow relative rotation therebetween with the units joined, when an excessive downward force is exerted to the keyboard unit by operation of the keyboard. In this case, the keyboard cover 8 tends to rotate down about the journals 43 so that the hook portion 44b is disengaged from the tongue 45 to allow rotation of the keyboard cover 8. This arrangement will protect the two units from a damage which may caused due to an excessive downward pressing force applied to the keyboard unit where the units are joined together.

It is to be understood that the invention is not limited to specific embodiments herein described and various modifications and variations may be made without departing from the spirits and scopes of the invention as defined in the appended claims.

What is claimed is:

1. A typewriter comprising:
   a keyboard unit having a plurality of operational keys and housed in a first housing;
   a print mechanism unit operated in response to operation of said operational keys to print characters on a print medium and housed in a second housing;
   first connect means for mechanically connecting said keyboard unit and said print mechanism unit so that said keyboard unit is supported by said print mechanism unit while being held in position against movement relative to said print mechanism unit at least in a downward pressing direction;
   second connect means including at least one hole portion provided on a rear edge of said first housing and a rod member provided within said second housing and arranged to be extendable toward said first housing for engagement in said hole portion whereby to further connect said keyboard unit and said print mechanism unit;
   said first connect means comprises first engaging means provided on either one of said first and second housings, and second engaging means provided on the other housing and engageable with said first engaging means; and
   said first engaging means comprises a downward projecting wall secured at its top to a rear edge of said first housing, and said second engaging means comprises an upward projecting wall secured at its bottom to a front edge of said second housing and engageable in front of said downward projecting wall so as to prevent horizontal movement of said first housing away from said second housing.

2. The typewriter according to claim 1 wherein said downward and upward projecting walls include inward extending portions engageable with each other.

3. The typewriter according to claim 1, wherein said first engaging means comprises a plurality of projections secured at one end thereof to a rear edge of said first housing and provided at the other free end thereof with through holes, and said second engaging means comprises a plurality of openings provided in a front edge of said second housing for receiving said projections and one or more of hook members provided within said second housing and adapted to be engaged with said through holes of said projections passing through said openings.

4. The typewriter according to claim 1 wherein said first engaging means comprises a plurality of projections extending from a front edge of said second housing, and said second engaging means comprises a plurality of recesses provided in a rear edge of said first housing for receiving said projections.

5. The typewriter according to claim 1 wherein said first engaging means comprises a plurality of projections extending from a front edge of said second housing and having holes near leading ends thereof, and said second engaging means comprises openings provided in a rear edge of said first housing for passing therethrough said projections and operating members provided inside said first housing and adapted to come into engagement with said holes of said projections.

6. A typewriter comprising:
   a keyboard unit having a plurality of operational keys and housed in a first housing;
   a print mechanism unit operated in response to operation of said operational keys to print characters on a print medium and housed in a second housing;
   mechanical connect means, including at least one pair of rotating arm members rotatable about a laterally extending axis between a first position wherein said keyboard unit is stored in a bottom of said first housing and a second position wherein said keyboard projects beyond a rear edge of said first housing;
   a recess portion provided in a front edge of said first housing for receiving said rotating arm members in said second position, said recess portion having a downward projection engageable with a leading end of said rotating arm members, for mechanically connecting said keyboard unit and said print mechanism unit so that said keyboard unit is supported by said print mechanism unit while being held in position against movement relative to said print mechanism unit at least in a downward direction.

7. A typewriter comprising:
   A first housing and a second housing
   a keyboard unit having a plurality of operational keys and housed in said first housing;
   a print mechanism unit operated in response to operation of said operational keys to print characters on a print medium and housed in said second housing;
   first connect means for mechanically connecting said keyboard unit and said print mechanism unit so that said keyboard unit is supported by said print mechanism unit while being held in position against movement relative to said print mechanism unit at least in a downward pressing direction;
   second connect means for further connecting said keyboard unit and said print mechanism unit so that said keyboard unit is held in position against movement relative to said print mechanism unit in a width direction; and
   adjusting means connected to said first housing and to said second housing through said first connect means for adjusting the inclination angle of said first housing relative to said second housing about an axis substantially parallel to said width direction.

8. The typewriter in accordance with claim 7 wherein said first housing includes:
   a top cover;
   an engageable block member provided within said first housing and including an engagement portion adapted to be connected to said second housing and further including a plurality of stepped grooves which are vertically arranged;
   a lever member extending from an under surface of said top cover, said lever member being adapted to be brought into engagement with any one of said stepped grooves whereby said inclination angle of said first housing is changed in accordance with the particular one of said grooves with which said lever member is brought into engagement.

9. The typewriter in accordance with claim 8 wherein said engageable block member inlcudes three stepped grooves.

10. A typewriter comprising:

a first housing and a second housing
a keyboard unit having a plurality of operational keys and housed in said first housing;
a print mechanism unit operated in response to operation of said operational keys to print characters on a print medium and housed in said second housing;
mechanical connect means having at least one pair of engagement portions respectively provided in said first and second housings, one of said pair of engagement portions being shiftable between (1) an engagement position for connecting said keyboard unit and said print mechanism unit so that said keyboard unit is supported by said print mechanism unit while being held against movement relative to said print mechanism unit at least in a downward pressing direction and (2) a disengagement position; said one of said pair of engagement portions comprising a rotating arm member rotatable about a laterally extending axis between said disengagement position at which it is stored in a bottom of said first housing and said engagement position at which it projects beyond a rear edge of said first housing, and wherein the other of said pair of engagement portions comprises a recess portion provided in a front edge of said first housing for receiving said arm member in the engagement position, said recess portion having a downward projection engageable with a leading end of said arm member.

* * * * *